Nov. 29, 1955    F. CARTLIDGE    2,724,976
CHAIN DRIVE MECHANISM
Filed July 30, 1951    3 Sheets-Sheet 1
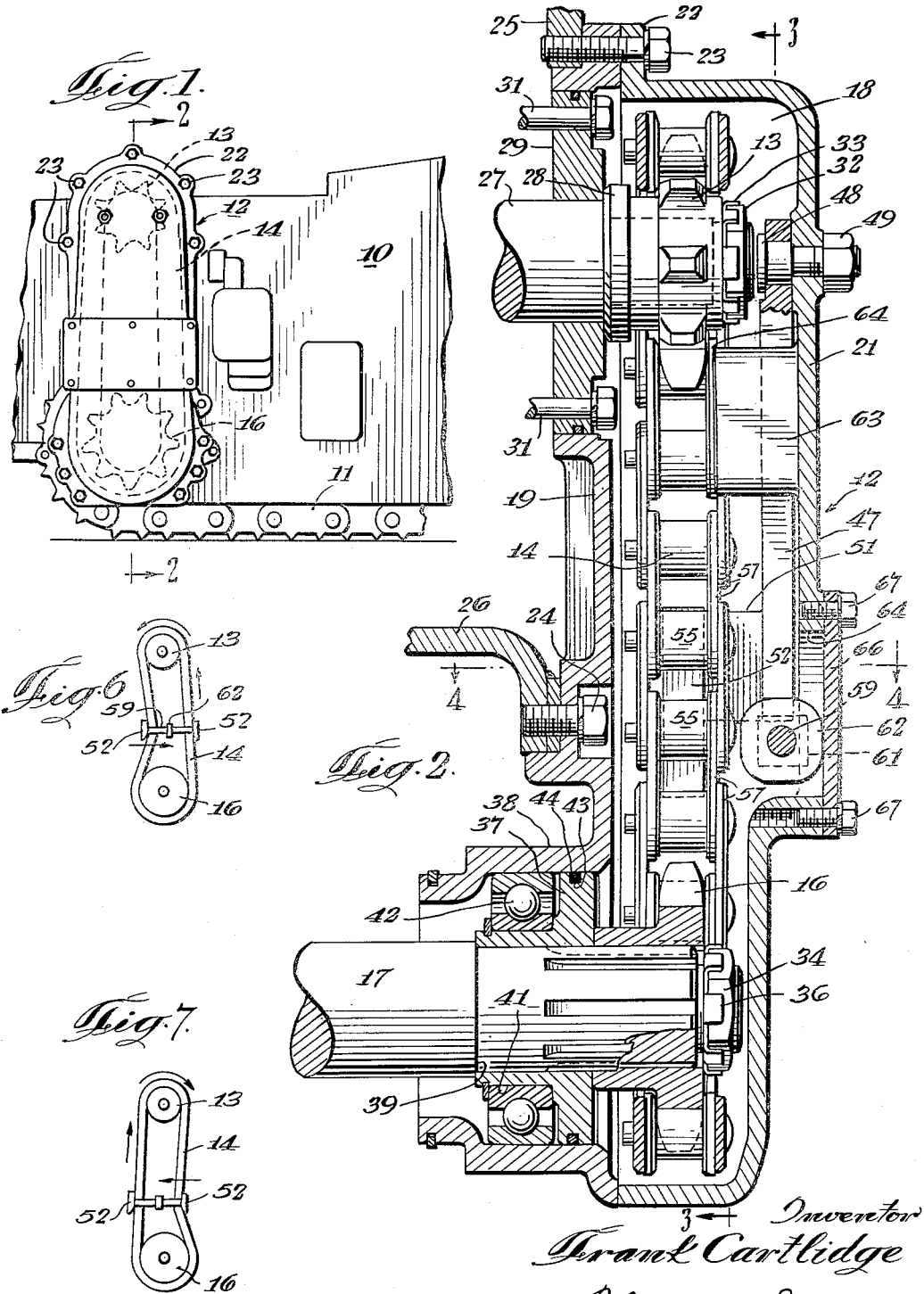
Inventor
Frank Cartlidge
By Murray G. Gleeson
Attorney

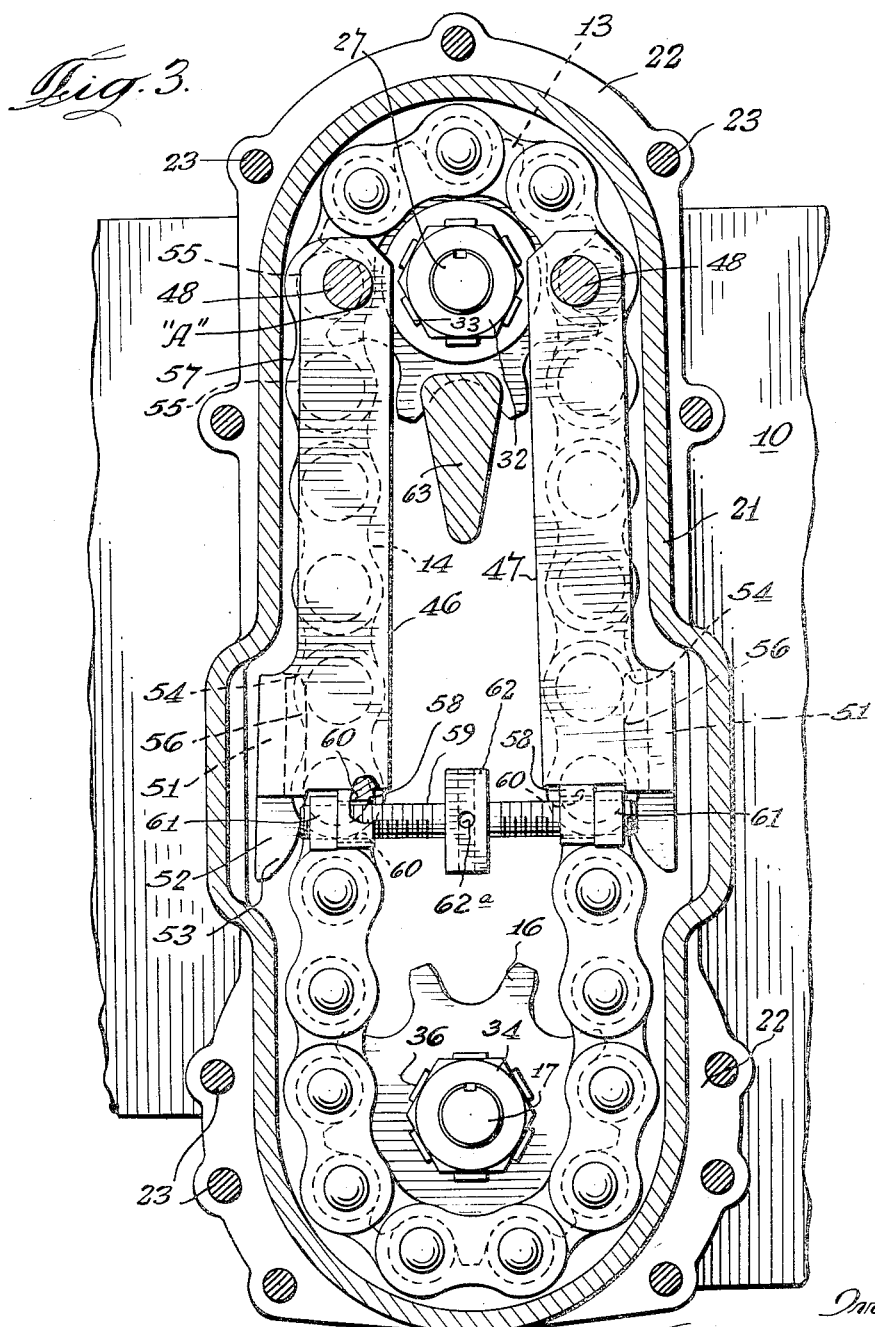

Nov. 29, 1955　　　F. CARTLIDGE　　　2,724,976
CHAIN DRIVE MECHANISM
Filed July 30, 1951　　　　　　3 Sheets-Sheet 3

Inventor
Frank Cartlidge
By Murray A. Gleeson
Attorney

United States Patent Office 2,724,976
Patented Nov. 29, 1955

2,724,976

CHAIN DRIVE MECHANISM

Frank Cartlidge, Chicago, Ill., assignor to Goodman Manufacturing Company, Chicago, Ill., a corporation of Illinois Application July 30, 1951, Serial No. 239,207

3 Claims. (Cl. 74—242.8)

The invention relates generally to chain drive mechanisms and relates particularly to devices for taking up the slack of the driving chain and for stripping the chain from the driving sprocket in the event the chain is broken under load.

In the use of chain drive mechanisms for transmitting power, the necessity for proper tensioning of the drive chain has been of importance in order to maintain a high degree of efficiency. The wear of the rollers and the chain links and the sprockets around which the chain is trained together tend to create an undesirable amount of slackness in the chain which places undue stresses thereon and prevents the smooth transfer of power from the driving sprocket to the driven sprocket. In addition, such slackness has oftentimes caused the chain to jump the sprocket teeth thereby damaging both the chain and the sprockets. Heretofore efforts to maintain the proper degree of tautness in the chain have generally been by way of providing means for adjusting the distance between the centers of the sprockets. Such expedients are simple enough in the case of bicycle chains, but in the case of heavy motor driven machinery the shifting of sprocket centers generally means shifting and re-aligning of driving motors and the like, a difficult task indeed.

The problem of preventing damage to the drive sprocket upon breaking of the chain has likewise not been entirely successful of solution, and heretofore chain strippers have been positioned between the two runs of the chain adjacent the drive sprocket, the stripper being arranged to have flange-like extensions embracing the sides of the drive sprocket, so that upon breaking of the chain the flanges would prevent wrapping of the broken chain around the drive sprocket. In accordance with the position of adjustment of the drive sprocket necessitated by the wear of both the chain and the sprockets, the stripper had likewise to be adjusted in position, and to achieve change in adjustment the stripper generally was mounted on rails or gibs to provide for such adjustment.

According to the present invention the proper amount of tension upon the driving chain is maintained without shifting the centers of the sprockets. In carrying out the invention, a pair of shoe carrying arms are pivotally mounted within the chain drive housing and are connected by a linkage which draws the arms together a required amount to place the proper degree of tension on the return run of the chain. The so connected shoe carrying arms are adapted to swing about their pivot points, so that the adjustment made for one direction of movement of the chain will also be accommodated for a reverse movement thereof. The chain drive housing is provided with an inspection port or opening so that the arms may be adjusted with respect to each other for proper tension of the chain, the cover for the inspection port being arranged to cooperate with the arm adjusting linkage to lock the linkage in a desired position of adjustment.

The practice of the invention is also characterized by a chain drive housing having a chain stripper supported on the interior wall thereof, the stripper extending into the housing and between the two runs of the chain and spaced slightly from one side of the driving sprocket. The chain stripper is so arranged with respect to the side of the sprocket and the links of the chain trained therearound that upon breakage of the chain, the stripper will engage the connecting links and divert the broken chain away from the driving sprocket, so that the chain cannot become wrapped therearound or otherwise jammed between the sprocket teeth and the walls of the housing.

With the foregoing considerations in mind it is a principal object of the invention to afford a chain drive mechanism wherein the drive chain is enabled to be properly tensioned at all times, such tensioning being achieved without the necessity of changing the distance between the sprocket centers, and also wherein such proper tensioning is achieved irrespective of the direction of movement of the chain.

Another object is to enable the proper tension to be placed on the driving chain by adjusting the position of chain engaging shoes mounted at the ends of arms which are pivotally supported within the chain drive housing.

Still another object comprehends the provision of a chain stripper so arranged as to remove the chain from the driving sprocket to prevent damage to the sprocket by the wrapping of the chain therearound upon breaking thereof.

Other objects and important features of the invention will be apparent from a study of the specification following taken with the drawings which together illustrate a preferred embodiment of the invention and what is now considered to be the best mode of applying the principles thereof. Other embodiments of the invention will be suggested to those having the benefit of the teachings of the within specification, and it is therefore intended that such other embodiments be reserved especially as they may fall within the scope and purview of the claims subjoined.

In the drawings:

Fig. 1 is an elevational view of a crawler tread operated mining machine having incorporated therein the improved chain drive mechanism according to the present invention;

Fig. 2 is a vertical section taken along the line 2—2 of Fig. 1, showing details of construction of the chain drive mechanism according to the present invention;

Fig. 3 is an elevational view of the chain drive mechanism looking in the direction of the arrows 3—3 of Fig. 2, the housing therefore being shown in section;

Fig. 6 is a more or less schematic view showing the shift in direction of the chain tightener for one direction of operation of the chain drive mechanism; and Fig. 7 is a view similar to Fig. 6 but showing the shift in position of the chain tightener upon operation of the chain drive mechanism in an opposite direction.

Figure 4:
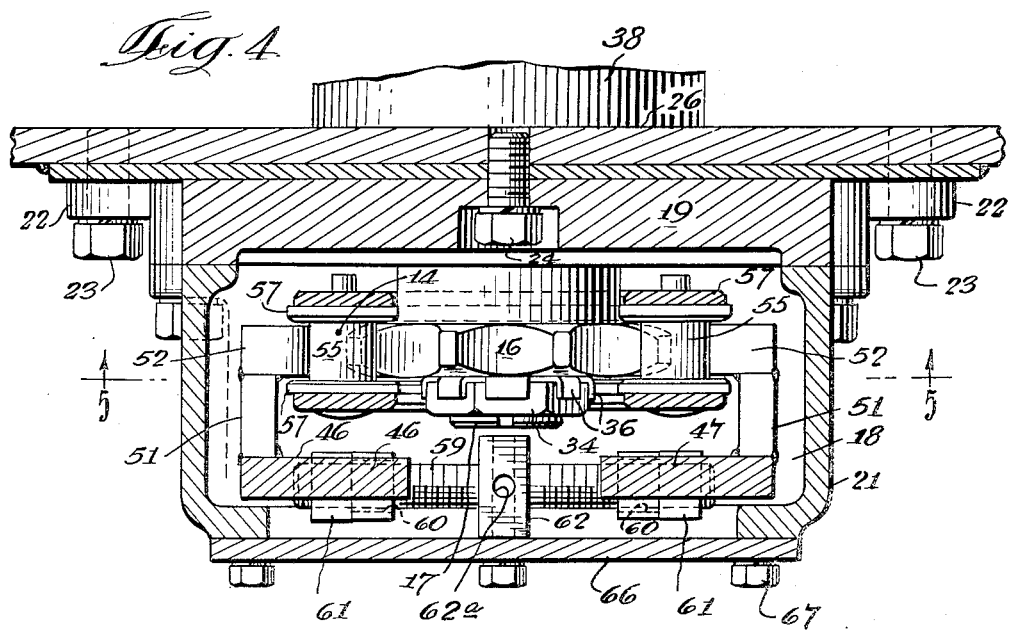
Fig. 4 is a view taken along the line 4—4 of Fig. 2 showing the chain engaging shoes.

Referring now to the drawings, there is shown in Fig. 1 a portion of an endless tread operated mining machine 10 having a pair of crawler treads 11, one only of such crawler treads being shown. Power is supplied to the endless tread 11 by a chain drive mechanism indicated generally by the reference numeral 12. The chain drive mechanism includes a driving sprocket 13, a driven sprocket 16, and an endless drive chain 14 trained around the sprockets 13 and 16 for the transfer of power. The driven sprocket 16 is fast upon a driven shaft 17, see Fig. 2, which turns a crawler tread sprocket, not shown, for driving one of the crawler treads 11. It may be noted that the mining machine 10 has a pair of such chain drive mechanisms 12, each being disposed on a side of the machine 10.

As seen with particular reference to Fig. 2, the chain drive mechanism 12 is enclosed within a housing 18 consisting of a housing backing plate 19 and a cover or closure 21 therefor. The closure 21 for the housing 18 is provided with a flange 22 therearound, and cap screws 23 hold the flange 22 to the backing plate 19 and to a side plate 25 of the mining machine 10. As seen also in Fig. 2, the backing plate 19 is also held by a countersunk cap screw 24 to a framing member 26.

The driving sprocket 13 is keyed to a driving shaft 27 and has a hub 28 which bears against a thrust ring 29 held in position by cap screws 31 to a frame member, not shown, of the mining machine 10. The driving sprocket 13 is additionally held on the shaft 27 by a nut 32 threaded to the end thereof, a washer 33 keyed to the shaft 27 and having bent up arms being provided for holding the nut 32 in position.

The driven sprocket 16 is splined to the driven shaft 17 and is held in position between a retaining nut 34 including a locking washer 36, and a thrust collar 37 supported on the shaft 17 and within an annular flange 38 of the backing plate 19, the thrust collar 37 bearing against a shoulder 39 formed on the driven shaft 17 and also affording a hub 41 for a bearing 42 retained in position between the hub 41 and the inside of the annular flange 38. The thrust collar 37 also has a recess 43 for an O-ring seal 44, serving to prevent the escape of lubricant from the housing 18.

From the description thus far it will be seen that the chain 14 will transmit power from the driving sprocket 13 to the driven sprocket 16 and the driven shaft 17 to drive one of the crawler treads 11 of the mining machine 10. In the transmission of power from the driving sprocket 13 to the driven sprocket 16, the slack in the chain 14 occasioned by the wear thereof and by wear of the sprockets of 13 and 16 causes the driving side or run of the chain 14 to take a position different from that of a desired straight line. Also, the return run or slack side of the chain 14 has a tendency to whip back and forth within the housing 18, such action of the return run and driving run of the chain causing the driven sprocket 16 and the driven shaft 17 to be driven non-uniformly. For the optimum transmission of power from the driving sprocket 13 to the driven sprocket 16, the driving side of the chain 14 should be maintained in a straight line and the return or slack side of the chain should be maintained under tension, but without making such tension of an amount as to impose undue strains upon the driving chain.

Previous devices for maintaining the slack or return side of the chain under tension have been open to the objection that they were not readily adapted to be shifted for operation of the chain mechanism in a reverse direction. According to the present invention, however, provision is made so that the driving run of the chain may be maintained in a straight line condition for optimum transmission of power, and so that the straight line condition of the driving side of the chain may be employed to place a proper degree of tension upon the return run of the chain. To this end the closure 21 provides a point pivotal support for a pair of arms 46 and 47, which hang in a substantially pendent position, as seen in Figs. 2 and 3, arm 46 extending along one run of the chain 14 and arm 47 extending along the other run. The arms 46 and 47 are held in position to the closure 21 by means of cap bolts 48 and nuts 49. The arm 46 has a lateral extension 51 therefrom, and a shoe 52 is secured to the end of the lateral extension 51, as by welding, and is maintained in contact with the outside of one run of the chain 14. As seen in Fig. 3, the shoe 51 has a gently curved leading edge 53 and a somewhat sharply curved trailing edge 54, the two edges 53 and 54 being continuous with a wearing surface 56 in contact with the rollers 55 of the chain 14.

The width of the shoe 52 and the wearing surface 56 is such as to rest only upon the rollers 55 and between side links 57 of the chain 14.

The arm 47 is likewise provided with a lateral extension 51 and shoe 52 which bears against the outside of the opposite run of the chain 14. The form of the arms 46 and 47 is such that they are symmetrical about a line passing through the center of the shaft 27 and the center of the shaft 17 when the arms hang freely and pendently from their points of pivotal support on the bolts 48.

The ends of the arms 46 and 47 remote from their points of pivotal connection to the closure 21 are provided with lugs 58, 58 which are drilled as at 60 in a direction which is substantially perpendicular to the axis passing through each of the arms 46 and 47 when they are hanging pendently. A turnbuckle 59 spans the distance between the arms 46 and 47 and extends through the openings 60 in the lugs 58, the two ends of the turnbuckle 59 having right and left handed threads engaged with nuts 61 bearing against the outer faces of the lugs 58. The turnbuckle 59 has a central nut 62 adapted to be received by any convenient torque transmitting tool for turning movement of the turnbuckle 59. The nut 62 is also arranged to have holes 62a bored therein for a capstan wrench, not shown. As seen with particular reference to Figs. 2 and 4, the closure 21 has an inspection port 64 closed by an inspection plate 66, cap screws 67 being provided for holding the inspection plate 66 in position over the inspection port 64. As seen in Figs. 2 and 4, the nut 62 is of such dimension as to be held in position against unintended movement thereof by the inspection plate 66, the sides of the nut 62 being spaced only a slight distance from the inside of the inspection plate 66.

Figure 5:
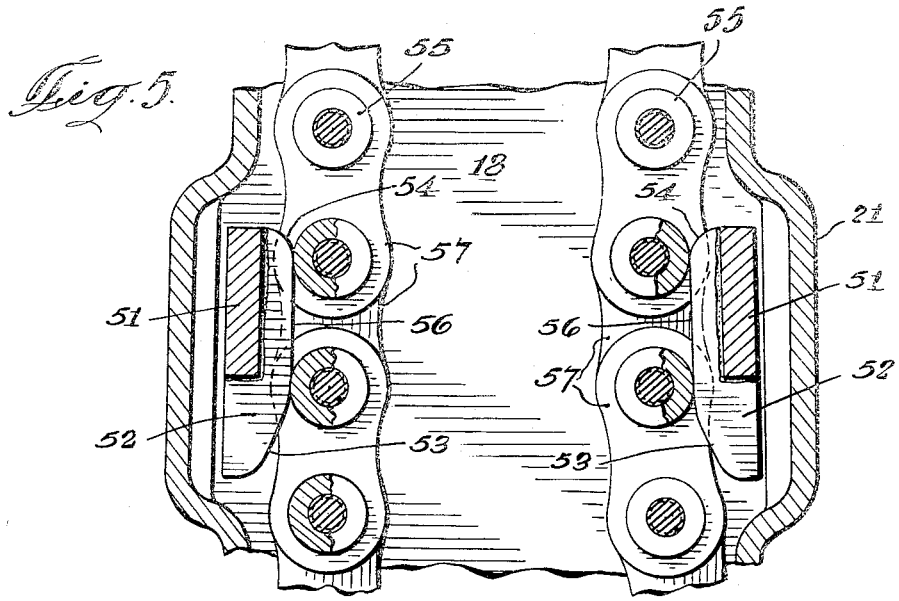
Fig. 5 is a front view taken along the line 5—5 of Fig. 4, looking in the direction of the arrows and showing how the chain engaging shoes place the proper degree of tension on the return run of the chain.

In adjusting the turnbuckle 59 so that the proper degree of tautness is placed upon the return run of the chain 14, the inspection cover 66 is first removed and the driving sprocket 13 is turned until the driving run of the chain lies along a straight line between the driving sprocket 13 and the driven sprocket 16. The turnbuckle 59 is then adjusted until the slack or return side of the chain is brought to the proper degree of tension, the driving run of the chain maintaining its straight line condition and the return run being pulled in toward the driving run as seen more clearly in Fig. 5. Considering the adjustment of the turnbuckle 59 for the condition where the left side of the chain, as seen in Figs. 3 and 5, is the driving run, the turnbuckle 59 is then adjusted until the return run, which in this instance is the right side, will be pulled inward to give the proper degree of tension thereto, as seen more clearly with reference to Fig. 7. In effecting such pulling in of the slack or return run of the chain 14 the arm 47 will pivot about its supporting bolt 48. When power is applied to the driving sprocket 13 to drive the driven sprocket 16 in the direction as shown in Fig. 7, the return or slack run will be maintained at all times with the proper degree of tension. Should the driving sprocket 13 be reversed, the arms 46 and 47 will shift on their pivot pins 48 so that the shoes 52 will take the position as seen in Fig. 6, the left side of the chain under such driving condition being considered the return or slack run of the chain, the right side of the chain 14 being considered the driving run.

It will thus be seen from the description thus far that the arms 46 and 47 together with the shoes 52, 52 and the turnbuckle 59 will enable the chain 14 to be maintained in a straight line along its driving side or run while the return side or run thereof will be maintained with the proper degree of tension irrespective of the driving direction of the chain 14. It will also be seen from the description thus far that one setting or adjustment of the arms 46 and 47 by the turnbuckle 59 is all that is required and that the arms 46 and 47 will shift properly according to the driving direction as more clearly seen in Figs. 6 and 7.

Means are also provided for stripping the chain 14 from the driving sprocket 13 in the event that the chain should become broken for some reason as might be occasioned by undue wear thereof or by an increase in load thereon beyond a proper amount. In the usual case, the chain is generally broken at some point along the driving run thereof, generally at the point of engagement of the chain roller 55 with one of the sprocket teeth of the sprocket 13, as for example at point A on the sprocket 13. Should the links 57 connecting the rollers 55 of the chain 14 break adjacent such point A, the continued rotation of the sprocket 13 normally tends to cause engagement of the succeeding roller 55 with the succeeding sprocket tooth, thus carrying the broken chain around the sprocket 13. The portion of the chain preceding such point A, considering the sprocket 13 to be rotating in a clockwise direction, as seen in Fig. 2, will be stripped from engagement from the sprocket 13 to fall down within the housing 18. However, the broken chain which would thus be normally carried by the sprocket 13 might tend to be carried around by the driving sprocket 13 to cause the chain to wrap around the sprocket 13 to cause damage to the sprocket. In order to prevent such action, the closure 21 is formed integrally with a chain stripper indicated generally by the reference numeral 63. As seen with particular reference to Fig. 2, the chain stripper 63 extends inwardly from the closure 21 to a position spaced slightly from the side of the driving sprocket 13, a clearance being afforded between the driving sprocket 13 and thhe stripper 63. As seen with respect to Fig. 3, the chain stripper 63 extends between the driving run and the return run of the chain 14, and is substantially triangular in cross-section with the base thereof uppermost and with the apex thereof extending downward. The chain stripper 63 extends, as seen in Fig. 3, closely enough to the sprocket 13 so that upon breaking of the chain 13, if there is any tendency of the chain to wrap about the sprocket 13, the stripper member 63 will be in a position to engage a series of the side links 57 of the chain 13 thus diverting the chain from around the sprocket 13 and in a direction toward the bottom of the chain drive housing 18 as seen in Fig. 3.

By the provision of the chain tightening mechanism heretofore described which provides for proper tensioning of the chain without the necessity of adjusting the distance between centers of the driving sprocket 13 and the driven sprocket 16, it is possible also to have a chain stripper which need not be adjusted in position with respect to the driving sprocket 13. The chain stripper according to the present invention thus need not be mounted in such a fashion as to be adjusted with respect to the driving sprocket 13. Nor is it necessary to have the stripper constructed in such a fashion as to have elements thereon disposed on each side of the driving sprocket 13. The stripper member according to the present invention need only be located in position adjacent to one side of the driving sprocket 13 so that it will engage the links of one side of the chain only to divert the chain away from the driving sprocket in the event of breakage of the chain.

While the chain drive mechanism according to the present invention has been described in terms of a preferred embodiment thereof it is not intended that the invention be limited by the precise embodiment described herein, other embodiments being capable of suggestion by the embodiment described herein, and it is intended that the invention be limited only by the scope and spirit of the claims here appended.

I claim:

1. In a chain drive mechanism having a driving sprocket and a driven sprocket including a chain trained therearound for transmitting power from said driving sprocket to said driven sprocket, a housing for said chain drive mechanism including a closure for said housing, a chain tightener for said chain comprising a pair of arms pivoted to said closure at fixed points, a shoe mounted at the end of each arm remote from its point of pivotal connection to said closure, each of said shoes being in contact with said chain, means comprising a turnbuckle connecting said pair of arms adjacent the ends thereof and for spacing said arms at a distance to provide proper spacing of said shoes while contacting said chain thereby maintaining proper tension on the return run of said chain, an inspection port in said closure including a cover for said port held to said closure, said inspection port being positioned in proximity to said chain engaging shoes, and means on said turnbuckle engageable with a torque transmitting tool for turning movement of said turnbuckle, said cover and said last named means being so disposed with reference to each other to prevent unintended turning movement of said turnbuckle.

2. In a chain drive mechanism having a driving sprocket and a driven sprocket including a chain trained therearound for transmitting power from said driving sprocket to said driven sprocket, a housing for said chain drive mechanism including a closure therefor, a chain tightener for said chain comprising a pair of arms pivoted to said closure at fixed points and extending substantially along the driving run and the return run of said chain respectively, a shoe extending laterally from each arm and mounted at the end of each arm remote from its point of pivotal connection to said closure, each of said shoes being in contact with the outer surface of said chain, and means comprising a turnbuckle connecting said pair of arms adjacent the ends thereof and adjacent said shoes and for spacing said arms at a distance to provide proper spacing of said shoes while in contact with said chain thereby maintaining proper tension on the return run of said chain.

3. In a chain drive mechanism having a driving sprocket and a driven sprocket including a chain trained therearound for transmitting power from said driving sprocket to said driven sprocket, a housing for said chain drive mechanism including a closure for said housing, a chain tightener for said chain comprising a pair of arms pivoted to said closure at fixed points, a shoe mounted at the end of each arm remote from its point of pivotal connection to said closure, each of said shoes being in contact with said chain, and means comprising a turnbuckle connecting said pair of arms adjacent the ends thereof for spacing said arms at a distance to provide proper spacing of said shoes while contacting said chain thereby maintaining proper tension on the return run of said chain.

References Cited in the file of this patent

UNITED STATES PATENTS

| | | |
|---|---|---|
| 414,774 | Merrell | Nov. 12, 1889 |
| 716,520 | Cole | Dec. 23, 1902 |
| 1,579,681 | Weller | Apr. 6, 1926 |
| 2,129,107 | Taylor | Sept. 6, 1938 |
| 2,526,173 | Thomassin | Oct. 17, 1950 |